(12) United States Patent
Gupta et al.

(10) Patent No.: US 7,461,230 B1
(45) Date of Patent: Dec. 2, 2008

(54) MAINTAINING SPATIAL LOCALITY OF WRITE OPERATIONS

(75) Inventors: Vikas K. Gupta, Santa Clara, CA (US); Ashish Agarwal, Mountain View, CA (US); Raghu Krishnamurthy, Santa Clara, CA (US)

(73) Assignee: Symantec Operating Corporation, Cupertino, CA (US)

( * ) Notice: Subject to any disclaimer, the term of this patent is extended or adjusted under 35 U.S.C. 154(b) by 322 days.

(21) Appl. No.: 11/095,906

(22) Filed: Mar. 31, 2005

(51) Int. Cl.
*G06F 12/00* (2006.01)
(52) U.S. Cl. ...................... 711/170; 711/162
(58) Field of Classification Search ................. 711/170, 711/162
See application file for complete search history.

(56) References Cited

U.S. PATENT DOCUMENTS

| | | | | |
|---|---|---|---|---|
| 6,129,460 A | * | 10/2000 | Baisley | ....................... 717/116 |
| 6,502,205 B1 | * | 12/2002 | Yanai et al. | ..................... 714/7 |
| 6,920,486 B2 | * | 7/2005 | Kiiskinen | .................... 709/214 |
| 7,032,033 B1 | * | 4/2006 | Ledoux et al. | .............. 709/248 |
| 7,149,761 B2 | * | 12/2006 | Cooke et al. | ................ 707/203 |

* cited by examiner

*Primary Examiner*—Reginald G. Bragdon
*Assistant Examiner*—Aracelis Ruiz
(74) *Attorney, Agent, or Firm*—Campbell Stephenson, LLP (57) ABSTRACT

A method, system, computer system, and computer-readable medium that identify the number of times areas of storage are updated and use that information to synchronize primary and secondary storage areas. The invention enables quick resumption of operations upon a discovery that primary and secondary data have become unsynchronized. Regions of storage that are unsynchronized can be identified quickly without the need to read the change log. In addition, data are copied efficiently, with minimal or no duplication of effort or data. Faster and more reliable storage can be allocated for storing regions of data that are "hot spots," thereby making better use of existing storage resources and budgets.

13 Claims, 5 Drawing Sheets

| Event | Primary Data Set at P1 | R1 | R2 | R3 | R4 | R5 | R6 | R7 | R8 | Replicated Data Set at S1 |
|---|---|---|---|---|---|---|---|---|---|---|
| 5.1 Begin | - - - - - | 0 | 0 | 0 | 0 | 0 | 0 | 0 | 0 | - - - - - |
| 5.2 Write A to R1 and Update R1 Counter | A_ _ _ _ | 1 | 0 | 0 | 0 | 0 | 0 | 0 | 0 | - - - - - |
| 5.3 S1 Receives R1=A | A_ _ _ _ | 1 | 0 | 0 | 0 | 0 | 0 | 0 | 0 | A_ _ _ _ |
| 5.4 S1 Acknowledges R1=A and R1 Count updated | A_ _ _ _ | 0 | 0 | 0 | 0 | 0 | 0 | 0 | 0 | A_ _ _ _ |
| 5.5 Write R4=C and Update R4 Counter | A_ _ C _ | 0 | 0 | 0 | 1 | 0 | 0 | 0 | 0 | A_ _ _ _ |
| 5.6 Write R4=D and update R4 counter | A_ _ D _ | 0 | 0 | 0 | 2 | 0 | 0 | 0 | 0 | A_ _ _ _ |
| 5.7 S1 Receives R4=C | A_ _ D _ | 0 | 0 | 0 | 2 | 0 | 0 | 0 | 0 | A_ _ C _ |
| 5.8 S1 Acknowledges R4=C and R4 counter updated | A_ _ D _ | 0 | 0 | 0 | 1 | 0 | 0 | 0 | 0 | A_ _ C _ |

*FIG. 5*

MAINTAINING SPATIAL LOCALITY OF WRITE OPERATIONS

BACKGROUND OF THE INVENTION

Information drives business. For businesses that increasingly depend on data and information for their day-to-day operations, unplanned downtime due to data loss or data corruption can hurt their reputations and bottom lines. Businesses are becoming increasingly aware of the costs imposed by data corruption and loss and are taking measures to plan for and recover from such events. Often these measures include making backup copies of primary, or production, data, which is 'live' data used for operation of the business. Backup copies of primary data are made on different physical storage devices, and often at remote locations, to ensure that a version of the primary data is consistently and continuously available.

One way to achieve consistency and avoid data loss is to ensure that every update made to the primary data is also made to the backup copy, preferably in real time. Often such "duplicate" updates are made on one or more "mirror" copies of the primary data by the same application program that manages the primary data. Mirrored copies of the data are typically maintained on devices attached to or directly accessible by the primary node, and thus are subject to failure of the primary node or to corruption of data that are accessible via the primary node. To ensure against these types of failures, data are also often replicated to a secondary location whenever an update is made to the primary data.

Typically, a secondary node is remote from the physical location of the primary node and can be accessed via a network, although it is not a requirement that the secondary node be physically remote. Primary and secondary nodes may be implemented as computer systems that communicate using a communication link, typically over a network connecting the primary and secondary nodes to other nodes. Data are replicated from the primary node, where an application program is running, to one or more secondary nodes. In many replication environments, each write operation by the application to the primary data results in one write operation to a log and another write operation that is replicated to the secondary storage area.

If the primary and secondary data become unsynchronized (after a primary node failure, for example), the primary and secondary data are resynchronized to establish a consistent starting point before replication can be restarted. Copying the entire set of primary data to each backup copy is one method to ensure that the data are consistent between the primary and secondary nodes. However, copying the entire set of primary data to each backup copy at secondary nodes uses network bandwidth unnecessarily when only a small subset of the primary data has changed since the most recent backup operation. Furthermore, copying the entire set of primary data across a network requires a significant amount of time, especially when large amounts of data, such as terabytes of data, are involved.

These factors weigh in favor of copying only data that have changed since the most recent backup operation to the replication storage area. One technique for copying only changed data is to establish an initial consistent copy of the primary data, and then send only changes to the primary data to the replication data storage. Such implementations typically maintain a log of changes and replicate each operation in the log in the same order in which the change was made to the primary data. Thus, the replication data is the same as the primary data, allowing for a time lag for data to be replicated from the primary node to the secondary node. If the primary and secondary data become unsynchronized due to an interruption in the replication process, the differences are captured as the changes in the log that have not yet been replicated to replication data storage. To synchronize primary and secondary data, only the unreplicated changes remaining in the log must be copied to the secondary data storage. This technique increases the efficiency of the resynchronization process.

But even using a change log does not solve all inefficiencies of maintaining replication data. If the log becomes full as a result of communication or node failure between the primary and secondary nodes, data for individual write operations can be lost. Typically, in such a case, the log is read to identify regions of primary data that have been changed but not replicated, and the entire region is copied from primary data storage to replication data storage. However, with the increasing size in enterprise data sets and lowered costs of data storage, logs on the order of several terabytes may exist. The time required to read the log itself to identify unsynchronized regions becomes a significant consideration. Furthermore, once primary and secondary data have become unsynchronized, an entire region's data are copied over the replication link. Only a small portion of the region's data may have changed, thereby resulting in wasted effort in copying data that have not changed.

An alternative to copying full regions is to read the log and send each write operation that has not yet been replicated. Such a synchronization method is sometimes referred to as "replaying the log." However, if certain areas of storage have been updated more frequently than other areas, other inefficiencies may occur. For example, if the application has "hot spots" on a disk that have been repeatedly updated, it is preferable to copy only the most recent update of the hot spot to the replication storage area. Resending each write operation in the log wastes effort by copying data that are replaced numerous times in subsequent write operations.

What is needed is the ability to maintain consistent, up-to-date secondary copies of primary data that enable quick resumption of operations upon a discovery that primary and secondary data have become unsynchronized. Preferably the solution would identify unsynchronized regions quickly and ensure that data are copied efficiently, with minimal or no duplication of effort or data.

SUMMARY OF THE INVENTION

The present invention relates to a method, system, computer system, and computer program product that track the number of times a region of storage is updated and use that information to synchronize primary and secondary storage areas. Operations can be quickly resumed upon a discovery that primary and secondary data have become unsynchronized. Regions of storage that are unsynchronized can be quickly identified, and alternative synchronization methods can be considered depending upon the particular circumstances specific to the resynchronization. In addition, data are copied efficiently, with minimal or no duplication of effort or data.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention provides the ability to maintain up-to-date, consistent copies of primary data on a secondary node in an efficient, cost-effective manner using minimal network bandwidth. In one embodiment, a method identifies a number of times that areas of storage are updated and uses that information to synchronize primary and secondary storage areas. Operations can be quickly resumed upon a discovery that primary and secondary data have become unsynchronized. Regions of storage that are unsynchronized can be identified quickly without the need to read the change log. Alternative synchronization methods can be considered depending upon the circumstances existing at the time that resynchronization is needed. In addition, data are copied efficiently, with minimal or no duplication of effort or data. Faster and more reliable storage can be allocated for storing regions of data that are "hot spots," thereby making better use of existing storage resources and budgets.

Figure 1:
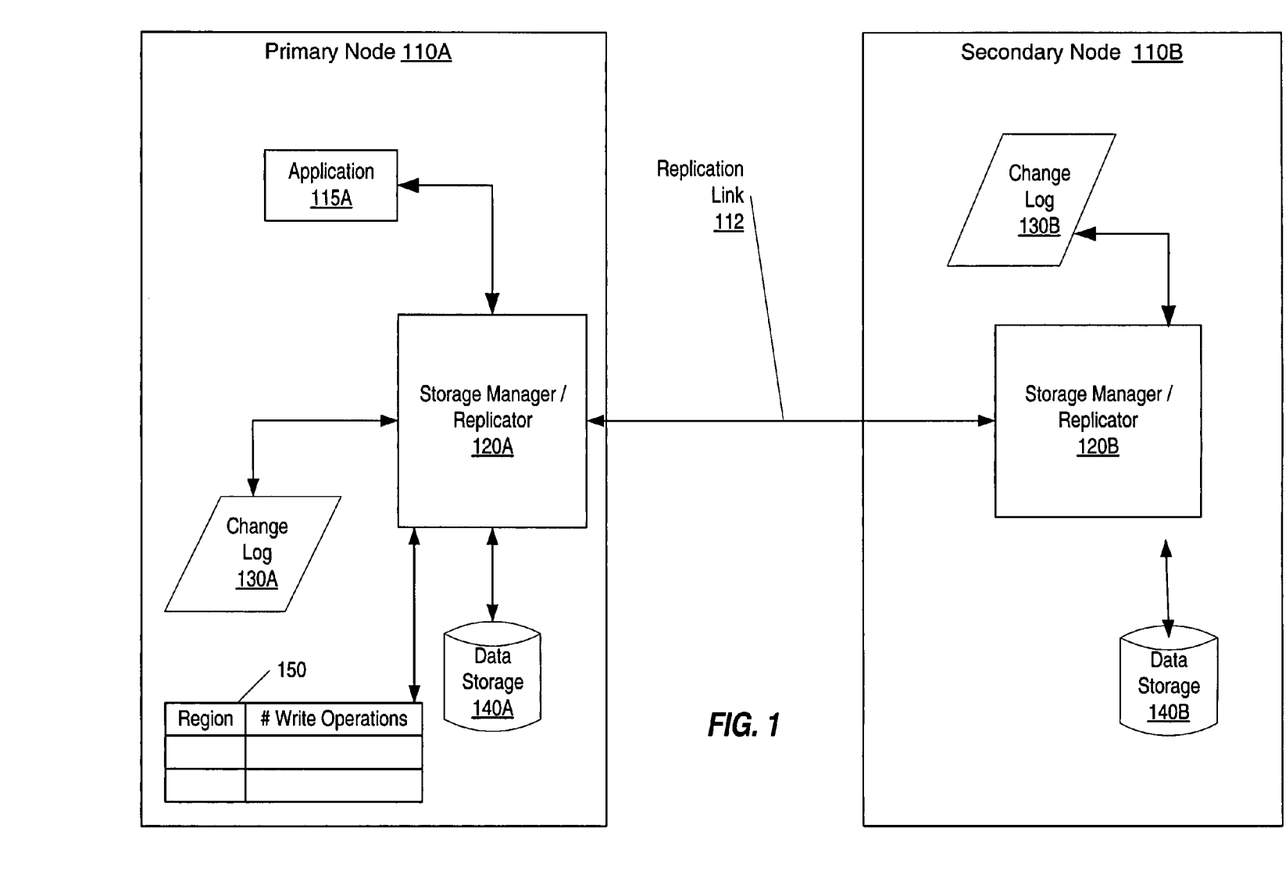
FIG. 1 shows an environment in which the present invention may be used.

FIG. 1 shows an environment in which the present invention may be used. Two nodes, primary node 110A and secondary node 110B, are connected via a replication link 112. The terms "host" and "node" are used interchangeably to describe computer systems. A node in a network managing the primary data/volume is referred to herein as a primary node, and a node in the network maintaining backup copies of the primary data but not the primary data itself is referred to herein as a secondary, backup, or remote node.

Primary node 110A hosts an application 115A, and primary data maintained by application 115A are replicated to secondary node 110B. Each of nodes 110A and 110B includes a storage manager/replicator, respectively storage manager/replicators 120A and 120B, which handles storage of data in data storage areas and replication of data to secondary storage areas. Storage manager/replicator 120A on primary node 110A manages storage of primary data maintained by application 115A. In response to a write operation by application 115A, storage manager/replicator 120A stores data in change log 130A and sends the write operation across replication link 112 to secondary node 110B. Ultimately, the update made by application 115A to the primary data is written from change log 130A to data storage 140A. Data storage may take form as groups of one or more physical devices, such as one or more dynamic or static random access storage devices, one or more magnetic or optical data storage disks, or one or more other types of storage devices. With respect to backup copies of primary data, preferably the backup storage devices are direct access storage devices such as disks rather than sequential access storage devices such as tapes.

In addition, the data replicated to secondary node 110B are ultimately stored in data storage 140B. The set of data that is replicated from one node to another, in this case the data stored in data storage areas 140A and 140B, is referred to herein as a "replication storage group."

Data consistency is ensured by coordinating write operations such that they occur in the same order on each secondary node as on the primary node. Primary change log 130A is time-ordered and contains the data for each individual update. Consequently, disk modifications occur in the same order on both the secondary and the primary node. The secondary node therefore represents a state of the primary node at a given point in time. If the secondary node takes over due to a disaster, the secondary data storage area 140B will be consistent with primary data storage 140A. Write ordering is strictly maintained during replication to ensure that each remote storage area is s consistent with the primary storage area.

The terms "write operation" and "update operation" are used interchangeably to describe making a change to data. The terms "change" and "modification," when used with reference to data, include adding new data as well as updating existing data. Each update to data in a replication storage group generates two write requests: one to a data storage area, and one to the change log. For this reason, data storage areas and change log storage areas are preferably configured on different physical disks to improve performance of the replication process.

In some embodiments, a change log on a secondary node, such as change log 130B on secondary node 110B, performs a different function than the function performed by the corresponding change log of the primary node, here change log 130A. Under normal operations, secondary change log 130B is not used. However, when the replication system is recovering after a temporary failure in communication between the primary and secondary nodes or from a primary or secondary node failure, updates can be stored in the secondary change log 130B and applied together to maintain data consistency. Using secondary change log 130B in this way ensures that data in data storage 140B on secondary node 110B transitions from one consistent data state to another.

In an alternative embodiment, the secondary change log, such as change log 130B on secondary node 110B, can be used as the first data storage area during replication. For example, data received at secondary node 110B may be written first to the secondary change log 130B and then copied to data storage area 140B.

A data change map (DCM) (not shown) can be employed to speed the synchronization process. In some implementations, a DCM is an object that contains a bitmap, and can be optionally associated with a primary data storage area. Bits in the bitmap represent ranges of data that are different between the primary and the secondary data storage areas.

A DCM is used when data at the secondary node have become inconsistent with data at the primary node. While a DCM is active, each bit that has been set in the DCM represents a region of the storage area that differs in content between the primary and secondary nodes. In some implementations, the DCM becomes active only when updates are unable to flow between the primary and secondary nodes, and the change log, such as change log 130A, is no longer large enough to hold accumulated updates. When the updates are able to flow from the primary to the secondary node, the administrator can use the storage manager/replicator 120A to initiate a resynchronization to incrementally synchronize the secondary node with the primary node using the bitmap. Data at the secondary node are inconsistent between the time the DCM resynchronization starts and completes, because write-order fidelity is not preserved. After the resynchronization is complete, the contents of the secondary data storage are consistent with the contents of the primary data storage and replication can resume as usual.

One drawback of using a DCM in the form of a bitmap is that the number of write operations performed on each region is not tracked. A DCM shows that the contents of a region are different between primary and secondary storage, but indicates only that at least one write operation has occurred to the primary storage that has not occurred to the secondary storage. No measure of the magnitude of the difference is made. Furthermore, if a DCM only becomes active when data have become inconsistent, no information is available about write operations to regions that are made while secondary data are consistent with the primary data.

One way to overcome this shortcoming is shown by a set of regional counters 150 of FIG. 1. For each region of data storage 140A, a number of write operations performed to the region is maintained in set of regional counters 150. When a given write operation is performed to data storage 140A, the respective regional counter is incremented. When that given write operation is acknowledged, the respective counter is decremented to show that the write operation has been performed on both the primary data storage 140A and secondary data storage 140B. These regional counters can be maintained for every write operation, and not only when the secondary data has become inconsistent with the primary data. These regional counters can therefore provide information about "hot spots" in the storage areas—e.g., regions that are frequently updated—or other information that occurs even while the secondary data are consistent with the primary data. In one embodiment, these regional counters are maintained by storage manager/replicator 120A.

Figure 2:
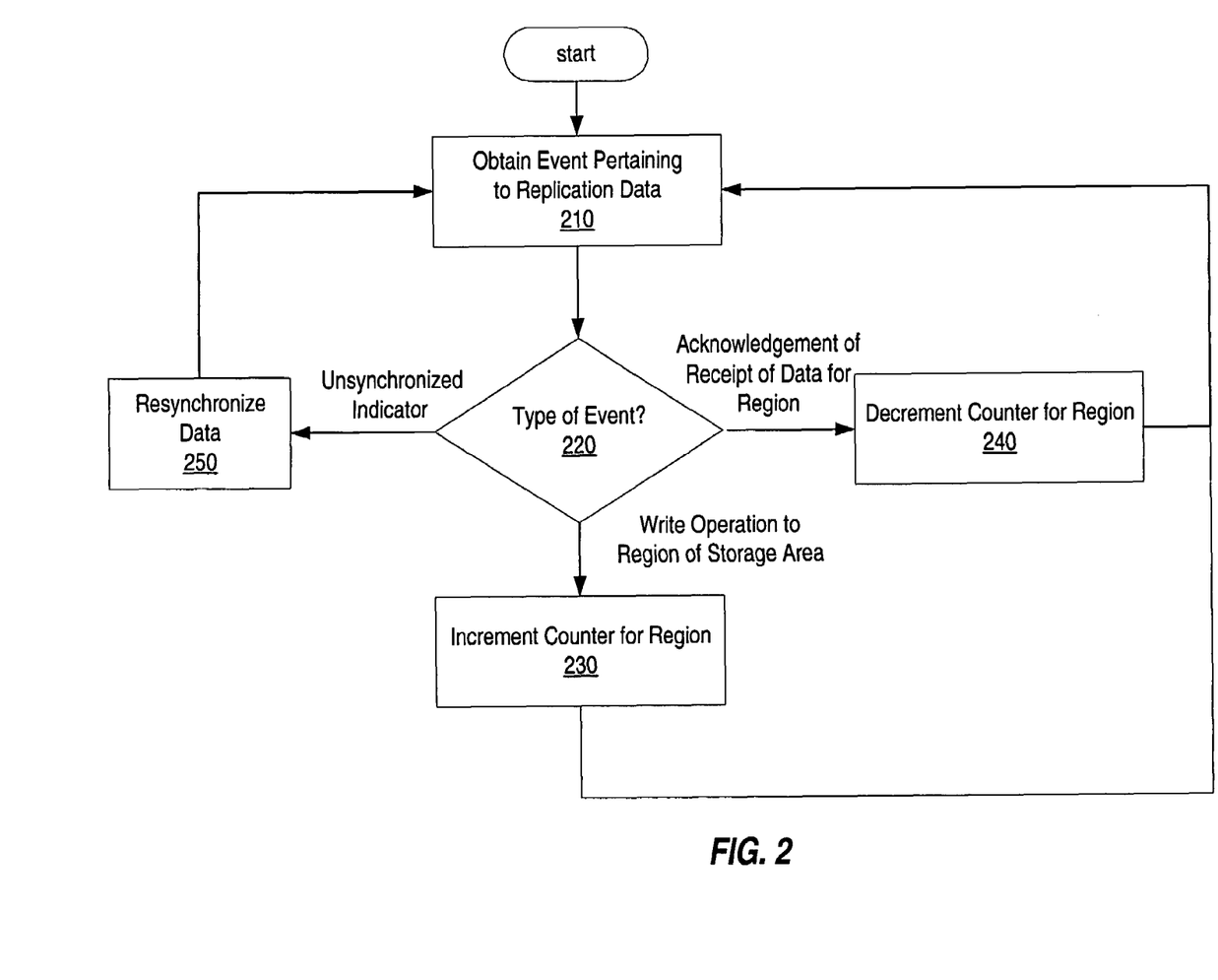
FIG. 2 is a flowchart showing responses to various types of events in accordance with one embodiment of the invention.

FIG. 2 is a flowchart showing responses to various types of events in accordance with one embodiment of the invention. In "Obtain Event Pertaining to Replication Data" step 210, an event pertaining to replication data for a given region is obtained. For example, the event may be a write operation to a region of the storage area, an acknowledgement that data associated with the write operation have been received from a replication storage area, or an indicator that the primary and secondary storage areas have become unsynchronized. Obtaining the events pertaining to replication data can be performed by a single module that performs all of the functionality shown in FIG. 2, or by an obtaining module, means, and/or instructions specifically configured to obtain events pertaining to replication data.

From "Obtain Event Pertaining to Replication Data" step 210, control proceeds to "Type of Event" decision point 220. Determining the type of the event can be performed by a single module that performs all of the functionality shown in FIG. 2, or by a determining module, means, and/or instructions specifically configured to determine types of events pertaining to replication data. If the event is determined to be a write operation to a region of the storage area, control proceeds to "Increment Counter for Region" step 230. A counter is incremented indicating a number of unreplicated write operations that have been made to that region of the storage area. Such a counter provides an indicator of the level of activity, and the "hot spot" nature, of the region. Control then returns to "Obtain Event Pertaining to Replication Data" step 210, where another event is awaited.

At "Type of Event" decision point 220, if the event is an acknowledgement that a write operation has been received at a replication storage area, control proceeds to "Decrement Counter for Region" step 240. The counter that was incremented when the write operation was performed is now decremented, indicating that the write operation has been replicated to the respective region of the replication storage area. Control then returns to "Obtain Event Pertaining to Replication Data" step 210, where another event is awaited.

At "Type of Event" decision point 220, if the event is an indicator that the primary and secondary data have become unsynchronized, control proceeds to "Resynchronize Data" step 250. Operation of "Resynchronize Data" step 250 is discussed further below with reference to FIG. 3. Control then returns to "Obtain Event Pertaining to Replication Data" step 210, where another event is awaited.

The operations performed in the flowchart of FIG. 2 can be performed, for example, by a storage manager/replicator, such as the storage manager/replicators 120A and 120B of FIG. 1, or by a collection of modules performing only one or more of those operations. For example, a commercially-available storage manager/replicator that can be adapted to include the inventive functionality is VERITAS Volume Manager/VERITAS Volume Replicator by VERITAS Software Corporation of Mountain View, Calif.

The set of regional counters, such as set of regional counters 150 of FIG. 1, provides more detailed information about write operations than do the binary bitmaps (DCMs) that are sometimes used to identify unsynchronized regions. Maintaining a counter that is capable of tracking values of two or greater provides a measure of the magnitude of the difference between the primary and secondary data storage areas. Furthermore, updating a counter for every write operation, even when the secondary data are consistent with the primary data, provides information about patterns of storage usage not available with a DCM that only becomes active when secondary data becomes inconsistent with the primary data. However, maintaining a multi-valued counter for each region requires more space than the space needed to store a single bit per region. With the continuing increases in system memory available in enterprise systems and the progressively lower costs of memory, the greater memory requirements for regional counters are offset by the gains in efficiency obtained by using the more detailed information provided by the counters.

Maintaining regional counters may affect performance of write operations. If a regional counter is updated in persistent storage with each write operation, write operations may take longer. However, this performance difference may be acceptable in some configurations. Alternatively, the regional counters may be maintained in memory only, particularly if node failures are uncommon. Another alternative is to periodically write the values of the regional counters from memory to disk along with an indicator of a current position in the change log. If node failure occurs and the counters in memory are lost, recovery can be performed by reading the log beginning at the most recently-recorded current position and updating the data change maps as described above. The frequency of writing the regional counters to disk can be reduced by, for example, writing the regional counters to disk upon beginning write operations to a new region. If no new regions are indicated for a period of time, the regional counters can be written to disk based upon specified time intervals. Gains in efficiency from using the regional counters are discussed for resynchronization with reference to FIGS. 3 and 4 below.

Figure 3:
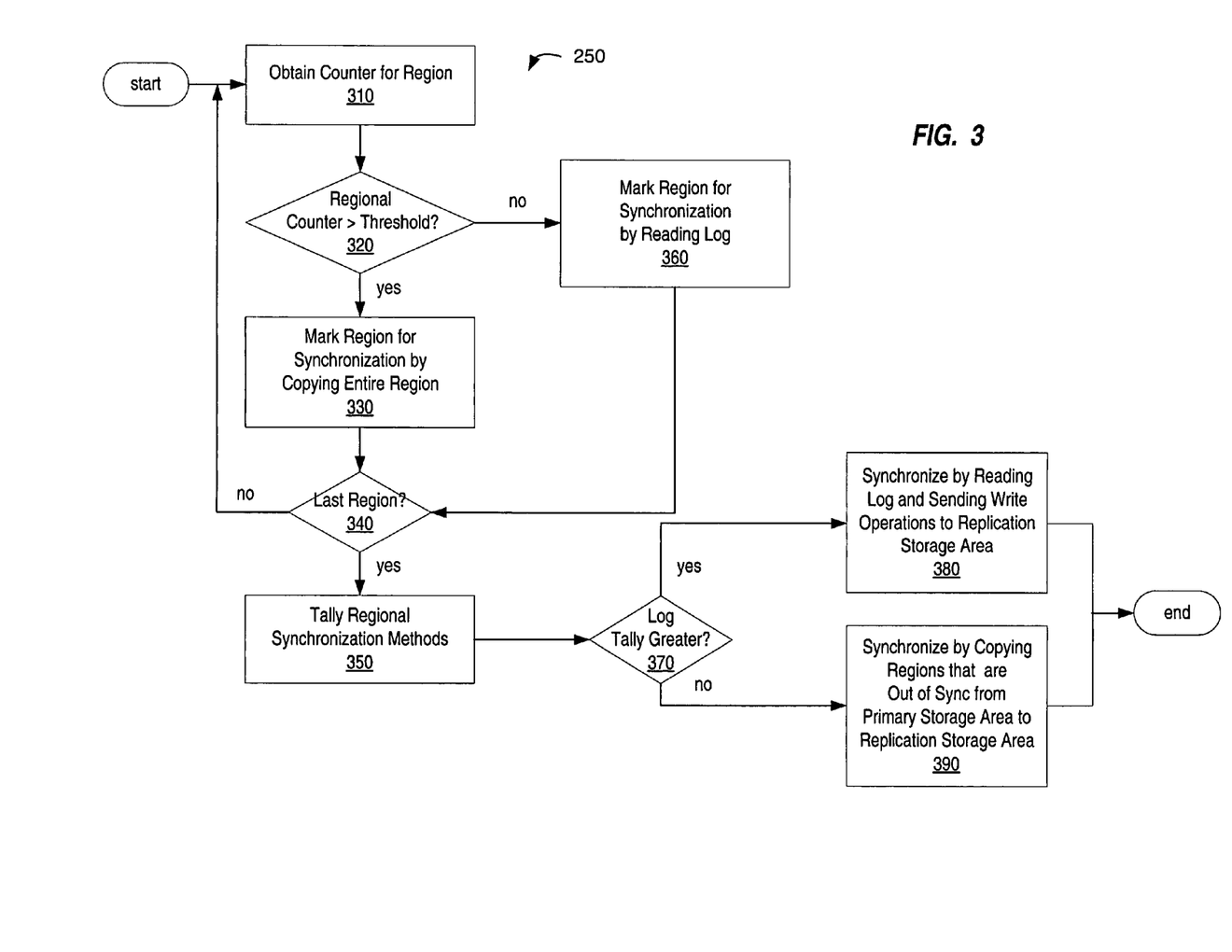
FIG. 3 is a flowchart showing one possible implementation of the "Resynchronize Data" step of the flowchart of FIG. 2 in accordance with one embodiment of the invention.

FIG. 3 is a flowchart of an implementation of the "Resynchronize Data" step 250 of the flowchart of FIG. 2 in accordance with one embodiment of the invention. In this example, regional counters are compared to a threshold to determine whether copying the entire region would be more efficient than reading the log to identify individual write operations to the region. A preferred method of synchronization for each region is identified, and a tally of synchronization methods for all regions is used to choose a synchronization method for all regions.

In "Obtain Counter for Region" step 310, the value of a regional counter is obtained. Control proceeds to "Regional Counter>Threshold" decision point 310, where the value of the regional counter is compared to a threshold. If the regional counter exceeds the threshold, control proceeds to "Mark Region for Synchronization by Copying Entire Region" step 330. If a threshold number of write operations have occurred, copying the entire region is likely to be more efficient than reading the log. At "Regional Counter>Threshold" decision point 310, if the regional counter is less than the threshold, control proceeds to "Mark Region for Synchronization by Reading Log" step 360. If few write operations have occurred to a region, and write operations normally update only a small portion of data when compared to the size of a region, reading the log and sending only those write operations to secondary data storage may be a more efficient technique for resynchronizing the data.

The threshold for the number of write operations can be pre-determined taking several factors into account. The threshold may be an absolute number that has been previously determined through empirical evidence. Alternatively, the threshold may be set as a percentage of the total number of write operations that have occurred. Still another method might take into account the average size of a write operation when compared to the size of a region when setting the threshold.

From "Mark Region for Synchronization by Copying Entire Region" step 330 and "Mark Region for Synchronization by Reading Log" step 360, control proceeds to "Last Region" decision point 340. If all regions have been marked, control proceeds to "Tally Regional Synchronization Methods" step 350. If regions remain to be marked, control returns to "Obtain Counter for Region" step 310 to obtain the regional counter for one of the remaining regions.

From "Tally Regional Synchronization Methods" step 350, control proceeds to "Log Tally Greater" decision point 370. For example, the log tally is greater when more regions have been marked for synchronization by reading the log than have been marked for synchronization by copying the entire region. When the log tally is greater, control proceeds to "Synchronize by Reading Log and Sending Write Operations to Replication Storage Area" step 380. Synchronization is performed by reading the log to identify write operations to be sent to the replication storage area. At "Log Tally Greater" decision point 370, if the log tally is not greater than the tally for copying the entire region, control proceeds to "Synchronize by Copying Regions that are Out of Sync from Primary Storage Area to Replication Storage Area" step 390. Each unsynchronized region (identified as each region having a regional counter greater than 0) is copied in its entirety from the primary storage area to the replication storage area.

FIG. 3 describes tallying regional synchronization methods to determine one synchronization method for synchronizing all unsynchronized regions. One skilled in the art will recognize that it is also within the scope of the invention to use different synchronization methods for different regions. For example, all regions marked for synchronization by reading the log may be synchronized by reading the log, and all regions marked for synchronization by copying the entire region may be copied in their entirety. Such an implementation is within the scope of the invention.

Figure 4:
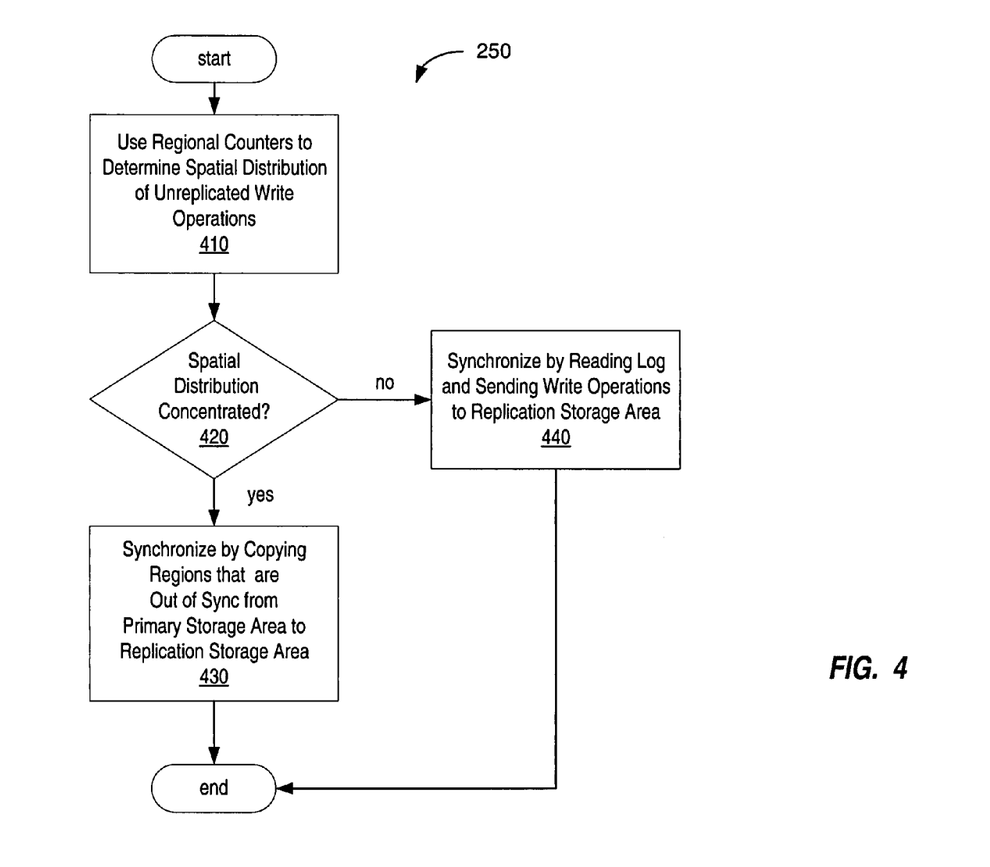
FIG. 4 is a flowchart showing another possible implementation of the "Resynchronize Data" step of the flowchart of FIG. 2 in accordance with one embodiment of the invention.

FIG. 4 is a flowchart of another implementation of the "Resynchronize Data" step 250 of the flowchart of FIG. 2 in accordance with one embodiment of the invention. In this example, the spatial distribution of unreplicated write operations is used to predict which method of synchronization (full region resynchronization as opposed to "replaying" the log) will be more efficient for all regions. For example, if a typical write operation affects only 4K bytes and each region contains 512K bytes, then copying an entire region that has been updated only once may be inefficient because of the low percentage of data affected within the region. In this situation, it may be more efficient to read the log and copy only the 4K of data affected by the single write operation. However, if a region has been updated fifty times, the likelihood that a larger percentage of data within the region has changed is higher, and copying the entire region may be more efficient than reading the log.

In "Use Regional Counters to Determine Spatial Distribution of Unreplicated Write Operations" step 410, the distribution of write operations that have not been replicated to the replication storage area is determined. The value of each regional counter calculated in the flowchart of FIG. 2 indicates a number of write operations that were not replicated from primary data storage to the replication data storage. Comparing the values of the regional counters between regions indicates the relative distribution of the unreplicated write operations.

Control then proceeds to "Spatial Distribution Concentrated?" decision point 420. If the write operations have been spatially concentrated in only a few regions, full region synchronization may be more efficient than reading the log. A concentration limit can be established based upon the business requirements of a given application; for example, if the write operations have occurred in only 25% of the number of regions, full region resynchronization may be appropriate. With spatially concentrated write operations, control proceeds to "Synchronize by Copying Regions that are Out of Sync from Primary Storage Area to Replication Storage Area" step 430. Each region with a non-zero regional counter is copied in its entirety from the primary storage area to the replicated storage area. Notice that it is not necessary to first read the log to identify the unsynchronized regions—the regional counters render reading the log to identify unsynchronized regions unnecessary. When all unsynchronized regions have been copied to the replicated storage area, the primary and replicated storage areas are synchronized.

At "Spatial Distribution Concentrated?" decision point 420, if the spatial distribution of write operations is not concentrated, the write operations may be distributed evenly across regions. In such a situation, resending write operations from the log may be a better synchronization method, since otherwise all data in most of the regions of the primary storage area will be copied from the primary to the secondary node. Therefore, for write operations that are not spatially concentrated, control proceeds from "Spatial Distribution Concentrated?" decision point 420 to "Synchronize by Reading Log and Resending Write Operations to Replication Storage Area" step 440. The log is read and each unreplicated write operation is sent to the replicated storage area; this process is also referred to as "replaying the log." When all write operations have been sent and acknowledged, the primary and secondary storage areas are synchronized again.

In the flowchart of FIG. 4, either full region resynchronization or "replaying" the log is selected as the more efficient method of resynchronization of the primary and replicated storage areas. This determination can be made automatically using pre-determined concentration limits. Alternatively, a policy-based engine may allow an administrator to identify parameters that can be evaluated and determined at the time of resynchronization. It is also within the scope of the invention that the appropriate synchronization method could be determined on a region-by-region basis, with some regions being copied in their entirety and the log being filtered for updates to other regions.

Maintaining counters for each region also enables "hot spots" to be tracked for applications. A "hot spot" is an area of storage that is frequently updated or accessed. This information can be used, for example, to identify data that can be migrated to faster and more reliable storage. Faster, more expensive storage can be allocated more efficiently where it is needed. Conversely, "cool spots" that are updated infrequently can be identified and migrated to less expensive and/or less responsive storage. Less expensive or less responsive storage need not be less redundant/resilient to failure. Migration of less-frequently used data to less expensive/less responsive storage enables more-frequently used data to use the faster, more expensive storage. Criteria for migration of data can be specified by organizational storage policies and monitored and performed automatically.

In an embodiment tracking "hot spots" and "cool spots," both read and write operations can be counted to capture all I/O to the regions in the storage area. I/O counters can be maintained as either a single set of counters for both read and write operations, or as separate sets of counters for read and write operations. In these embodiments, the respective I/O counter is not decremented upon acknowledgement of an I/O operation to maintain the I/O frequency information. It is within the scope of the invention to maintain both I/O counters that are not decremented and counters for replicated write operations that are decremented upon acknowledgement of a write operation. However, I/O counters and counters for replicated write operations can be used independently of each other; I/O counters can be used without counters for replicated write operations, and vice versa.

Yet another possible implementation is to maintain two sets of counters—one set that is incremented (I/O counters) and another set that is decremented (replicated write operation counters). Using these two sets of counters, a net count can be calculated for purposes of identifying unreplicated write operations. The I/O counters can be used identifying hot spots and cool spots for implementing storage policy.

Using the I/O counters, storage for regions can be dynamically migrated depending upon the frequency of update. For example, a free storage pool can be maintained with data storage (disks/LUN) with varying storage characteristics in terms of read and write response times, cost per unit (bytes), and cost per unit operations per second (for example, cost per database transactions per minute, or cost for a certain response time from the disk). Migration of data can be performed with or without an application using the data being online. Data are migrated to storage from the storage pool that best matches the requirements as specified by an administrator or by organizational storage policy. Migration can be done periodically or dynamically, with continuous monitoring of performance.

Figure 5:
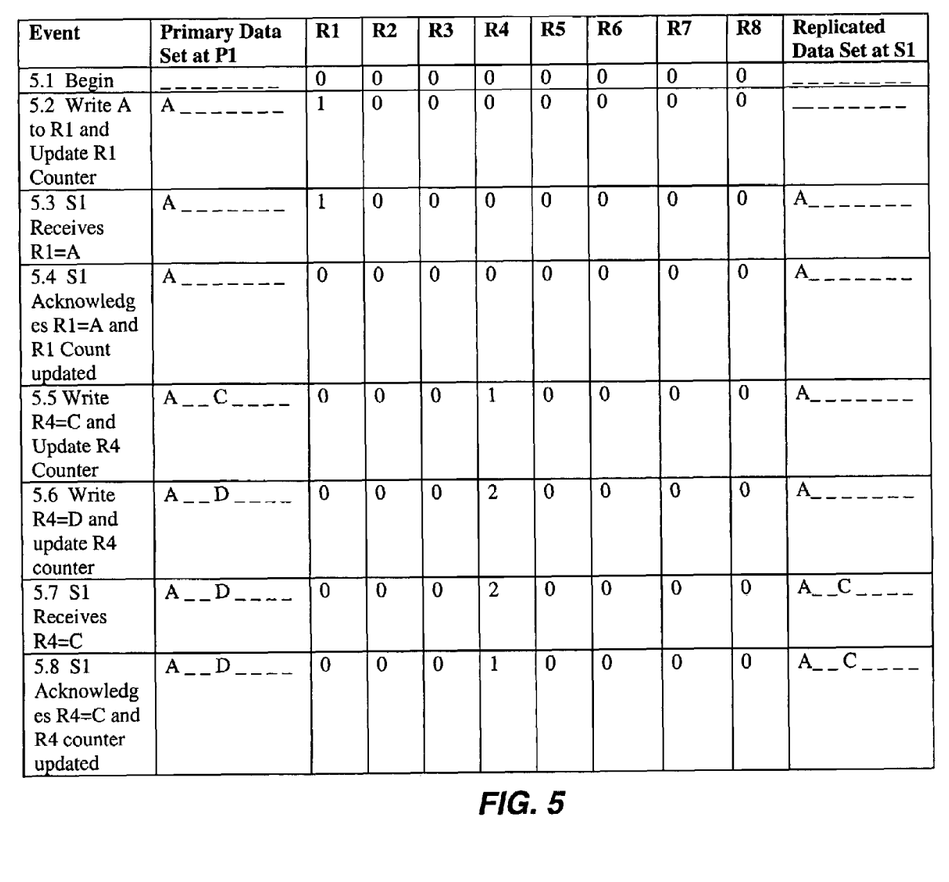
FIG. 5 is a table showing a series of events and data tracked for each event in accordance with one embodiment of the invention.

FIG. 5 is a table showing a series of events and data tracked for each event in accordance with one embodiment of the invention. Event 5.1 shows the initial state of a primary data set at a primary node P1 and a replication data set at a secondary node S1. Data for each of eight regions of the primary data set are shown, with a single character representing the contents of each region. In this example, an underscore character _ is used to represent an empty region. Initially, none of the eight regions has data in either the primary data set or the replication data set. Counters for each of the eight regions are initialized to have a value of zero.

In event 5.2, a value of A is written to region 1 of the primary data set and the region 1 counter, R1, is updated to indicate that one write operation has been performed (but not yet replicated) to region 1. At this point, the primary data set and replication data set are unsynchronized by one write operation to region 1. In event 5.3, the data associated with the write operation R1=A is received at the secondary node S1, as shown in the replication data set. In event 5.4, secondary node S1 acknowledges the write operation R1=A, and the regional counter for region 1, R1, is updated to have a value of zero, indicating that no unreplicated write operations have been performed on region 1. At this point, the regional counters all have values of zero, indicating that the primary and replication data sets are synchronized.

In event 5.5, a value of C is written to region 4 and the counter for region 4, R4, is updated to have a value of one. At this point, the primary and replication data sets are unsynchronized by one write operation to region 4. In event 5.6, a value of D is written to region 4, and the R4 counter is updated again to have a value of two. At this point, the primary and replication data sets are out-of-sync by two write operations to region 4. In event 5.7, secondary node S1 receives the write operation R4=C, as shown in the replication data set. In event 5.8, secondary node S1 acknowledges the write operation R4=C and the R4 counter is decremented to have a value of one. At this point, the primary and replication data sets are unsynchronized by one write operation to region 4.

After event 5.8, if the communication link were to fail between primary node P1 and secondary node S1, the regional counter R4 would indicate that region 4 is unsynchronized between the primary and replication data sets. There is no need to read the log to identify unsynchronized regions, which are captured in the regional counters. To resynchronize the primary and replication data sets, data for region 4 can be copied from the primary data set to the replication data set.

The present invention provides many advantages. The number of write operations to areas of storage are tracked and that information is used to synchronize primary and secondary storage areas. Operations can be quickly resumed upon a discovery that primary and secondary data have become unsynchronized. Regions of storage that are unsynchronized can be identified quickly without the need to read the change log. Alternative synchronization methods can be considered depending upon the circumstances existing at the time that resynchronization is needed. In addition, data are copied efficiently, with minimal or no duplication of effort or data. Faster and more reliable storage can be allocated for storing regions of data that are "hot spots," thereby making better use of existing storage resources and budgets.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   in response to a write operation to a region of a plurality of regions of a storage area, incrementing a respective counter of a plurality of counters;
   in response to an acknowledgement that the write operation to the region is received at a replication storage area, decrementing the respective counter for the region;
   identifying a set of unreplicated write operations from the plurality of counters, wherein a non-zero counter value of the plurality of counters indicates a number of unreplicated write operations for the region; and
   examining a spatial distribution of the set of unreplicated write operations among the respective regions to select a synchronization method.

2. The method of claim 1, further comprising:
   when the spatial distribution of the set of unreplicated write operations is below a concentration limit,
      reading a log of write operations to the storage area, and
      sending each unreplicated write operation in the log to the replication storage area.

3. The method of claim 1, further comprising:
   when the spatial distribution of the set of unreplicated write operations is greater than or equal to a concentration limit,
      for each non-zero counter in the plurality of counters, copying the respective region of the storage area for the non-zero counter to the replication storage area.

4. The method of claim 1, wherein the selected synchronization method comprises:
   synchronizing the storage area and the replication storage area by performing the following:
      for each non-zero counter in the plurality of counters, copying the respective region of the storage area for the non-zero counter to the replication storage area.

5. The method of claim 1, wherein the selected synchronization method comprises:
    synchronizing the storage area and the replication storage area by performing the following:
        reading a log of write operations to the storage area, and
        sending each unreplicated write operation in the log to the replication storage area.

6. The method of claim 1, further comprising:
    using the respective value of at least one counter of the plurality of counters to identify a type of storage to store data for the respective region.

7. The method of claim 6, further comprising:
    migrating the data for the respective region to a storage area that comprises the type of storage.

8. The method of claim 1 wherein each counter of the plurality of counters is capable of tracking a value of at least two.

9. A computer-readable storage medium comprising:
    incrementing instructions for incrementing a respective counter of a plurality of counters in response to a write operation to a region of a plurality of regions of a storage area;
    decrementing instructions for decrementing the respective counter for the region in response to an acknowledgement that the write operation to the region is received at a replication storage area;
    identifying instructions for identifying a set of unreplicated write operations from a plurality of counters; and
    examining instructions to examine a spatial distribution of the set of unreplicated write operations among the respective regions to select a synchronization method.

10. The computer-readable storage medium of claim 9, further comprising:
    first selecting instructions to select copying a given region as the synchronization method if a non-zero counter value for the given region exceeds a threshold; and
    second selecting instructions to select synchronization instructions comprising the following if the non-zero counter value for the given region does not exceed the threshold:
        reading instructions to read a log of write operations to the storage area, and
        sending instructions to send each unreplicated write operation in the log to the replication storage area.

11. The computer-readable storage medium of claim 9, further comprising:
    using instructions to use the respective value of at least one counter of the plurality of counters to identify a type of storage to store data for the respective region.

12. The computer-readable storage medium of claim 11, further comprising:
    migrating instructions to migrate the data for the respective region to a storage area that comprises the type of storage.

13. A computer system comprising:
    a memory comprising the computer-readable storage medium of claim 9; and a processor coupled to the memory to execute said instructions on the computer-readable storage medium.

* * * * *